Patented Jan. 5, 1954

2,665,188

UNITED STATES PATENT OFFICE 2,665,188

STABILIZATION OF THE VISCOSITIES OF VAT DYE PASTES

Chris C. Schulze, Cranford, and Charles Orenyo, Bloomfield, N. J., assignors to General Aniline & Film Corporation, New York, N. Y., a corporation of Delaware No Drawing. Application January 3, 1951, Serial No. 204,288

5 Claims. (Cl. 8—34)

The present invention relates to stabilization of the viscosities of aqueous vat dye pastes and to such stabilized compositions.

Many vat dyestuffs are sold in the open market in the form of aqueous dye pastes. Thus, representatives of the thioindigos, indigos, pyranthrones and dibenzanthrones are worked up and sold in this fashion. Such sales are predicated primarily upon the fact that it is more economical to sell the vat dyestuffs in the form of aqueous pastes rather than to go to the expense of completely drying the vat dyes. Furthermore, the products, when in the form of pastes, are handled with greater ease by the ultimate consumer of the dyestuffs.

It is, of course, essential that any aqueous vat dye paste have a low viscosity and that this property be retained on long storage. Unless the pastes have such property, the difficulties attendant upon the drying out and precipitation of the pastes more than offset the advantages realized in working up the products in the form of pastes.

Any of the vat dye pastes which appear on the market become troublesome if the pigment-water ratio is sufficiently increased. There are some, however, which are particularly troublesome at the concentration at which they are normally manufactured, in that thick, non-flowing pastes are generally obtained. Among the dyes which have proved to be particularly troublesome from this standpoint are, for example:

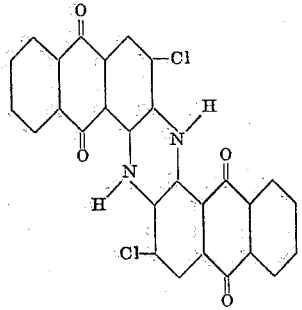

3,3'-dichloro-N-dihydro-1,2,1',2'-anthraquinoneazine

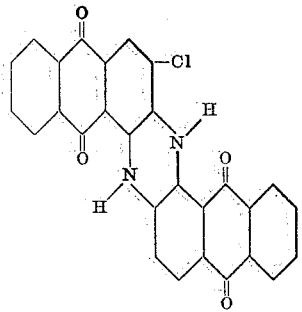

3-chloro-N-dihydro-1,2,1',2'-anthraquinoneazine

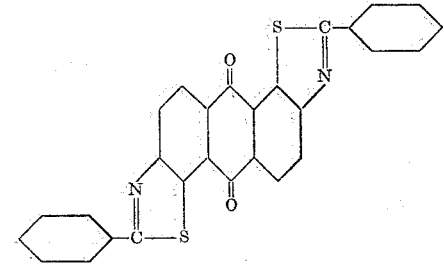

2,8-diphenylanthra-(2,1,6,5)-bisthiazole-6,12-dione

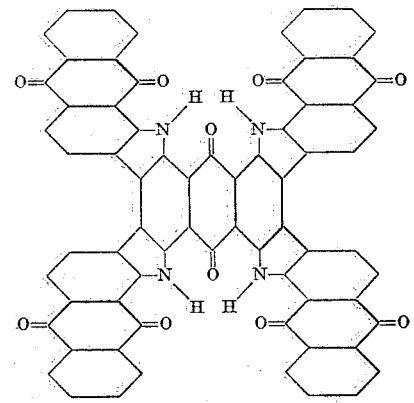

6,8,25,27-tetrahydroanthra-(1,2-b,4,3-b',5,6-b'',8,7-b''')-tetrakisnaphth-(2,3-g)-indole-5,7,9,14,19,24,26,28,33,38-decone

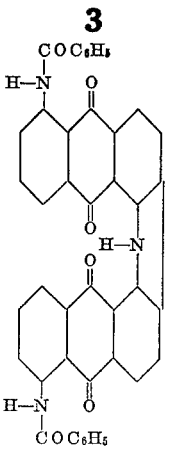

4,11-dibenzamido-16H-dinaphtho (2,3-a,2',3'-i) carbazole-5,10,15,17-tetrone

The reasons why certain dyestuffs are produced in the form of thick, non-flowing pastes are complex and not well understood. It is probable that the formation of the thick paste is due to the retention of large amounts of water by the suspended dyestuff. On the other hand, it is not clear whether the water is retained in the capillary spaces by simple entanglement in an interlacing structure or by hydration of the aggregates, with a consequent thickening. It is known that a very small particle size increases the difficulty. This would, of course, be expected, regardless of the forces at work because of the larger surface area resulting from a decrease in particle size.

The problem, which we have solved, has been given considerable attention by the dyestuff industry in the past, and various means have been suggested in an effort to find an adequate solution. One such proposal involves the forcing of water from the pigment by bringing physical pressure to bear, as in a hydraulic press. Some improvement was noted with this proposal when water was returned to the system. This method is, however, limited by high cost, and at times by an adverse effect on the product.

Control of the particle size distribution of the pigment represents another means of obtaining improved paste condition. By adjusting the method of precipitation of the pigment or by digestion of the pigment in a suitable medium, the particle size may be varied, thus furnishing a means of controlling the paste condition.

The most common means employed, however, to combat thick pastes is the addition of a surface active agent. To this end there has been employed, for example, the sodium or magnesium lignosulfonates, the condensation products of naphthalene sulfonates with formaldehyde, and the like. These surface active agents have a favorable effect in some instances but long experience has established them to be completely inadequate in many dye systems.

We have now discovered that aqueous vat dye pastes of low viscosity in a stable form may be obtained by incorporating in the pastes, a small quantity of a trialkylolamine triester of an aliphatic acid. The particular mechanism by which these triesters function to stabilize the vat dye pastes at a low viscosity has not been ascertained. It is known that the trialkylolamine triesters are not surface active agents and their effect is not attributable to a wetting action. It is also known that the results which we achieved are specific to the trialkylolamine triesters, and are not obtainable with, for instance, the mono or diesters, or the esters of other alkylolamines such as monoethanolamine, diethanolamine and the like. As a matter of fact, of all the compounds which we investigated in an effort to find a satisfactory stabilizer, the desired results were achieved only with the trialkylolamine triesters.

The use of such triesters for stabilizing aqueous vat dye pastes at low viscosities, and the pastes so obtained, constitute the purposes and objects of the present invention.

The aliphatic acid which is employed in the formation of the triesters of the trialkylolamine should contain at least 4 carbon atoms. If this precaution be observed, triesters functioning in the desired manner will be obtained, irrespective of the particular acid chosen, i. e. whether saturated, unsaturated, monobasic or dibasic. Thus we have found that esters meeting the prerequisites of the present invention are obtained from butyric acid, valeric acid, caproic acid, caprylic acid, undecyclic acid, lauric acid, myristic acid, stearic acid, oleic acid, linoleic acid, ricinoleic acid and sebacic acid. The esters may be derived from one or a plurality of such acids, particularly those which are monobasic.

Examples of triesters which we have found to be suitable are triethanolamine tributyrate, triethanolamine tricaprylate, triethanolamine tristearate, triethanolamine trilaurate, triethanolamine trimyristate, triethanolamine trioleate, triethanolamine trilinoleate, triethanolamine triricinoleate, triethanolamine trisebacate, the mixed ester from triethanolamine with 1 mol of butyric acid and 2 mols of stearic acid, the mixed ester from triethanolamine with 2 mols of caprylic acid and 1 mol of oleic acid, and the like.

The esters may be obtained according to the procedure described in Reissue Patent 21,530 granted August 13, 1940 to Wolf Kritchevsky.

The quantity of the ester employed will vary but is usually in an amount ranging from 5 to 75% by weight of the vat dyestuff. Quantities over 75% may be used without harm, but with no appreciable advantage over the lesser amount.

It is recommended that the pastes include, in addition to the above triesters, a dispersing agent which may be of the type previously mentioned, to wit, sodium lignosulfonate or the reaction product of formaldehyde with a naphthalene sulfonate.

The triesters may be incorporated in the paste by different methods. Thus a press cake of the vat dye and the triester may be mixed together and sufficient water added to provide the desired pigment-water ratio. On the other hand, the dye may be slurried with water, the triester added and the slurry filtered and then the press cake treated with water to give the desired pigment-water ratio.

Our method envisages the mechanical manipulation of the pigment in water after addition of the triester as by means of a ballmill or the like. Prior to such manipulation, the pH of the solution is preferably adjusted to the acid side, and after manipulation to the neutral or alkaline side.

The invention is illustrated by the following examples, but it is to be understood that the invention is not restricted thereto. The parts are by weight unless otherwise stated.

*Example 1*

11 parts of 3,3'-dichloro-N-dihydro-1,2,1',2'- anthraquinoneazine are mixed with 2 parts of sodium lignosulfonate and 2 parts of triethanolamine tricaprylate. A quantity of water equal to 85 parts and sufficient to obtain the desired pigment-water ratio is added. The pH is adjusted to 5–6 with sulfuric acid and the system ballmilled for 24 hours. The pH is raised to 7–8 with sodium hydroxide. The resulting paste has a low viscosity. The physical condition remains unchanged on storage over long periods at any temperature which might normally be expected to exist in a warehouse.

*Example 2*

10 parts of 2,8-diphenylanthra (2,1,6,5) bis-thiazole-6,12-dione and 10 parts of 4,11-dibenzamido-16H-dinaphtho (2,3-$a$,2′,3′-$i$) carbazole-5,10,15,17-tetrone are mixed with 5 parts of triethanolamine tricaprylate, 5 parts of sodium lignosulfonate and enough water to obtain the desired pigment-water ratio. The pH is adjusted to 7–8 and the paste ballmilled for 24 hours. The resulting paste has the characteristics described in Example 1.

*Example 3*

28 parts of 6,8,25,27-tetrahydroanthra (1,2-$b$, 4,3-$b'$,5,6-$b''$,8,7-$b'''$) tetrakisnaphth (2,3-$g$) indole - 5,7,9,14,19,24,26,28,33,38 - decone is mixed with 2 parts of naphthalene sulfonate-formaldehyde condensation product and 2 parts of triethanolamine tricaprylate and sufficient water to obtain the desired pigment-water ratio. The pH is adjusted to 9 and the paste ballmilled for 24 hours. The paste has the characteristics described in Example 1.

*Example 4*

100 parts of 3,3′-dichloro-N-dihydro-1,2,1′,2′-anthraquinoneazine are slurried with enough water to make a 20–1 water-pigment ratio. 20 parts of triethanolamine tricaprylate are added to the slurry which is then heated to 90–95° C. This temperature is maintained for three hours. The slurry is then filtered.

22 parts of pigment from the presscake obtained is mixed with 3.5 parts of sodium lignosulfonate and enough water to get the desired pigment-water ratio. The pH is adjusted to 5–6 and the paste ballmilled for 24 hours. The paste has the characteristics described in Example 1.

*Example 5*

The procedure is the same as in Example 1, excepting that there is used triethanolamine trioleate in lieu of the triethanolamine tricaprylate.

*Example 6*

The procedure is the same as in Example 1, excepting that the pH is adjusted from 2 to 3 prior to ballmilling the paste.

*Example 7*

The procedure is the same as in Example 2, excepting that the triester employed is triethanolamine tributyrate.

It is to be understood that in the above examples the pigment used is in presscake form. The presscake may be obtained by any of the usual means employed in the trade, as, for example, precipitation from sulfuric acid into water, followed by filtration.

Various modifications of the invention will occur to persons skilled in the art. For example, instead of using a ballmill, as in the examples, other mills such as an Eppenbach or Premier Mill may be used with equal effectiveness. Similarly, in lieu of the particular triesters of the examples, any of the triesters mentioned above may be employed. The same is true with regard to the vat dyestuffs since the invention is equally effective with any water insoluble vat dye such as thioindigos, i. e. 6,6′-diethoxythioindigo, indigos, i. e. 5,5′-7,7′-tetrabromindigo, pyranthrones, i. e. pyranthrone and brominated pyranthrone, dibenzanthrones, i. e. Jade Green, isodibenzanthrones, i. e. isoviolanthrone, and the like. We, therefore, do not intend to be limited in the patent granted, except as necessitated by the prior art and the appended claims.

We claim:

1. A vat dye in paste form essentially comprising a dispersion of said dye in water by means of a dispersing agent selected from a group consisting of water soluble lignosulfonates and reaction products of formaldehyde with a naphthalene sulfonate, said dispersion being stabilized at low viscosity with a trialkylolamine triester of an unsubstituted aliphatic carboxylic acid containing at least 4 carbon atoms.

2. The composition as defined in claim 1 wherein the dispersing agent is sodium lignosulfonate.

3. The composition as defined in claim 1 wherein the dispersing agent is a reaction product of formaldehyde with a naphthalene sulfonate.

4. The composition as defined in claim 1 wherein the triester is present in an amount ranging from 5 to 75% by weight of the vat dye.

5. The composition as defined in claim 1 wherein the triester is triethanolamine tricaprylate.

CHRIS C. SCHULZE.
CHARLES ORENYO.

References Cited in the file of this patent

UNITED STATES PATENTS

| Number | Name | Date |
|---|---|---|
| Re. 21,530 | Kritchevsky | Aug. 13, 1940 |